(No Model.) 2 Sheets—Sheet 1.
J. J. ANDERSON.
MACHINE FOR COILING BARS OF METAL.
No. 350,612. Patented Oct. 12, 1886.
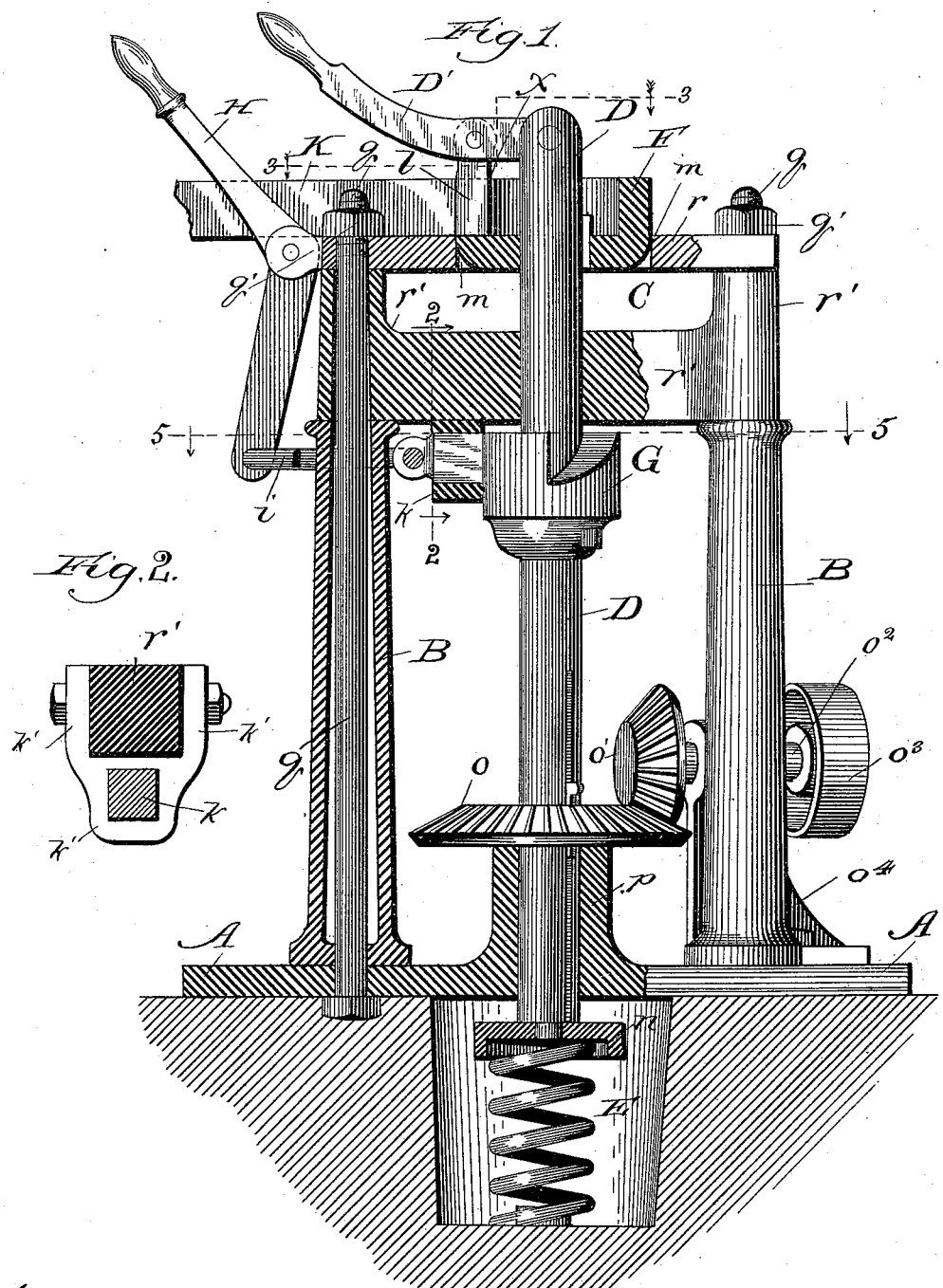
Witnesses:
Chas. E. Gaylord
C. S. Plare
Inventor,
James J. Anderson,
By Dyrenforth and Dyrenforth,
Attys (No Model.) 2 Sheets—Sheet 2.
J. J. ANDERSON.
MACHINE FOR COILING BARS OF METAL.
No. 350,612. Patented Oct. 12, 1886.
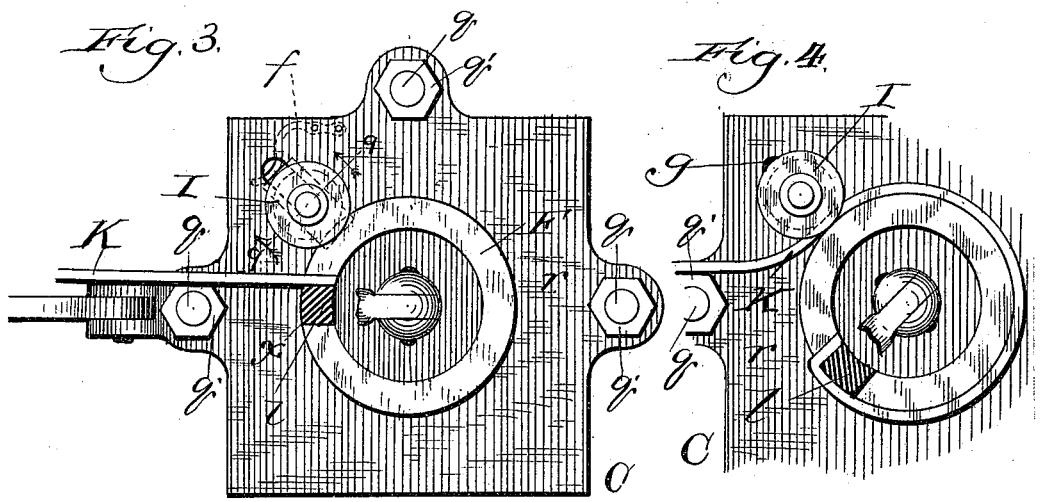
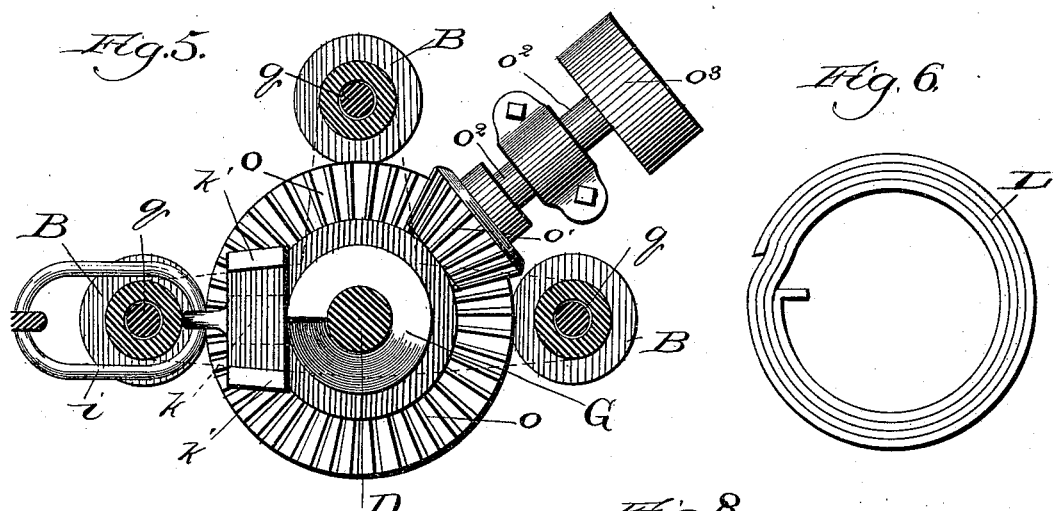
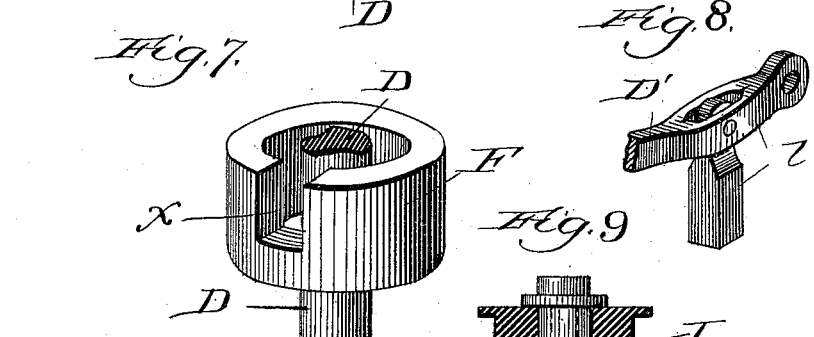
Witnesses:
Chas. E. Gaylord
A. Paré
Inventor:
James J. Anderson

UNITED STATES PATENT OFFICE.

JAMES J. ANDERSON, OF CHICAGO, ILLINOIS, ASSIGNOR OF ONE-HALF TO ASA G. PETTIBONE AND A. H. MULLIKEN, BOTH OF SAME PLACE.

MACHINE FOR COILING BARS OF METAL.

SPECIFICATION forming part of Letters Patent No. 350,612, dated October 12, 1886.

Application filed February 9, 1886. Serial No. 191,298. (No model.)

*To all whom it may concern:*

Be it known that I, JAMES J. ANDERSON, a citizen of the United States, residing at Chicago, in the county of Cook and State of Illinois, have invented certain new and useful Improvements in Machinery for Manufacturing Coupling-Links for Cars; and I hereby declare the following to be a full, clear, and exact description of the same.

My invention relates to the manufacture of coupling-links for the purpose named, which has for its object the production of such links without the usual welded joint, whereby a weak place is afforded in the article, and this objection is overcome by coiling bar metal to produce a ring of the desired dimensions, welding the layers to produce a homogeneous annular body, and shaping the welded ring to the form of a coupling-link. In the manufacture of these coupling-links I employ three separate machines—one for the coiling of the metal bar, another for welding the layers of the coil into a homogeneous annular body, and the third for shaping the welded ring. Each of these machines forms the subject of a separate application for Letters Patent, all of which applications are filed concurrently.

The subject-matter of the present application is the machine for carrying out the first step in the method of manufacturing the links from coiled and welded bar metal—viz., that of forming the coil.

My invention consists in the general construction of the machine, and it also consists in certain details of construction and combinations of parts, all as hereinafter more fully set forth.

Referring to the drawings, Figure 1 is a sectional side elevation of my improved machine with certain parts broken away; Fig. 2, a detail view taken on the line 2 2 of Fig. 1; Fig. 3, a plan view taken on the line 3 3 of Fig. 1; Fig. 4, a similar but broken view explanatory of the operation; Fig. 5, a sectional plan view taken on the line 5 5 of Fig. 1; Fig. 6, a plan view of the finished product of the machine ready to be welded; Fig. 7, a perspective view of the coiling barrel or form detail on its shaft, shown broken away; Fig. 8, a similar but broken view of another detail for wedging the end of the bar at starting a coil into rigid contact with the coiling barrel or form, and Fig. 9 a sectional detail view taken on the line 9 9 of Fig. 3.

A is the base or bed plate of the preferably vertical machine-supporting columns B, preferably three in number, as shown, and which carry on their upper ends the tables C, comprising the top plate, $r$, and supporting-base therefor, $r'$, both of which parts $r$ and $r'$ have central openings to admit through them the vertical shaft D, hereinafter described. The parts A, B, $r$, and $r'$ are firmly secured together in their relative positions (shown in Fig. 1,) by means of headed rods $q$ and clamping-nuts $q'$, which rods and nuts also sustain the columns B in proper position. The shaft D extends at its lower end through the center of the base A, where it is surrounded by a collar, $p$, cast with the base-plate and affording a seat for the beveled horizontal gear-wheel, $o$, keyed to the shaft D, to permit reciprocation of the latter, and through the medium of which the shaft is rotated by the beveled gear-wheel $o'$ in mesh with the wheel $o$ and supported on the end of a shaft, $o^2$, carrying at its opposite extremity the belt-wheel $o^3$, and sustained in a suitable standard, $o^4$, bolted to the base A. The shaft D is supported, to render it yielding, by means of a suitable cap, $n$, upon a spiral spring, E, located, preferably, as shown, below the surface of the bed-plate A, and having a sufficient normal resistance to sustain the shaft D at the extremity of its resilient capacity.

Upon the shaft D, and keyed centrally thereon toward its upper extremity, is a barrel or form, F, normally having its base in the opening $m$ in the plate $r$, which opening is sufficiently large to permit the barrel to reciprocate vertically through it, and the edge of the barrel is notched or recessed, as shown at $x$, to receive a somewhat narrower wedge, $l$, loosely pivoted to a lever, D', as shown in Fig. 8, which is fulcrumed toward its extremity to the shaft D, near the upper end of the latter.

Below the part $r'$ of the table C is a collar, G, secured upon the shaft D, and cam-shaped upon its upper edge, (see Fig. 1,) affording a cam to cause the lowering of the shaft D against the resistance of the spring E, when desired, as hereinafter stated, by the insertion of a wedge, $k$, working within a suitable guide, $k'$, or guide-box extending in proper position from the lower surface of the part $r'$ of the table C, and the wedge $k$ is forced upon or withdrawn from the cam G by means of a bent lever of the first kind, H, properly fulcrumed to a column, B, and connected at its working end with the wedge $k$ by means of a link, $i$, encircling the column, to prevent the latter from affording an obstruction.

The foregoing description includes all the parts of the machine except the flanged bearing-roller I, (see Fig. 9,) which rotates upon its supporting-shaft $h$, extending through a slot, $g$, in the plate $r$, and rendered yielding by means of a spring, $f$, preferably of the form shown, which resists the lateral pressure against the roller I, produced by the increase in cross-section of the coil, the layers of which are forced upon one another in the operation of winding by the bearing effect of the roller I.

To operate the machine to produce a coil, L, of the form shown in Fig. 6, a metal bar, K, heated, if desired, and of the necessary length to produce a coil of the desired number of layers, is inserted at one end horizontally into the notch $x$ of the form F, and wedged therein by means of the wedge-block $l$. The rotation of the shaft D, by means of the beveled gear and belt-wheel connection $o$ $o'$ $o^2$ $o^3$ with the driving-power, will cause the metal bar to be coiled, one layer upon the other, the yielding roller I insuring the desired compactness of the layers. When thus coiled, to permit the removal of the coil L, the wedge-block $l$ is withdrawn by the lever D', to which it is loosely pivoted, to cause the lever and wedge-block to extend vertically above the shaft D, when the lever H is actuated to wedge the block $k$ against the surface of the cam G, whereby the shaft D will be lowered against the resistance of the spring E, the coiled bar will be freed from contact with the form F, owing to the seating of the latter around the opening $m$ in the plate $r$, and the coil may be lifted from its seat and thrown to an attendant at a furnace in desired close proximity to the coiling-machine, where the coil is heated or reheated to a welding heat before being adjusted upon the welding-machine, which, as hereinbefore stated, forms the subject of a separate concurrent application for Letters Patent. With the removal of the coil, as stated, the shaft D is forced into its normally-operative position by the resilience of the spring E, (the wedge $k$ being withdrawn,) and the machine is then in readiness to operate upon another inserted bar K.

What I claim as new, and desire to secure by Letters Patent, is—

1. In a coiling-machine, the combination, with the base, of a rotary shaft, a supporting-table surrounding the shaft, and a form upon the shaft, substantially as described.

2. In a coiling-machine, the combination, with the base, of a yielding rotary shaft, an annular supporting-table surrounding the shaft, and a form upon the shaft to fit within the opening in the supporting-table, substantially as described.

3. In a coiling-machine, the combination, with the base A, of a rotary shaft, a supporting table surrounding the shaft, a form upon the shaft, and a yielding presser-roll upon the table to operate with the form, substantially as described.

4. In a coiling-machine, the combination, with the base A, of a rotary shaft, D, a supporting-table, C, surrounding the shaft, and a notched form, F, upon the shaft, substantially as described.

5. In a coiling-machine, the combination, with the base A, of a yielding rotary shaft, D, an annular supporting-table, C, surrounding the shaft, and a notched form, F, upon the shaft, substantially as described.

6. In a coiling-machine, the combination, with the base A, of a rotary shaft, D, a spring, E, supporting the shaft to render it yielding, an annular supporting-table, C, surrounding the shaft, a form, F, upon the shaft to fit within the opening in the supporting-table, and means, substantially as described, for depressing the shaft against the resistance of the spring, substantially as set forth.

7. In a coiling-machine, the combination, with the base A, of a rotary shaft, D, a spring, E, supporting the shaft to render it yielding, an annular supporting-table, C, surrounding the shaft, a notched form, F, upon the shaft to fit within the opening in the supporting-table, means, substantially as described, for depressing the shaft against the resistance of the spring, and means, substantially as described, for wedging the end of a bar to be coiled in the notch of the form, substantially as set forth.

8. In a coiling-machine, the combination, with the base A, of a rotary shaft, D, a spring, E, supporting the shaft to render it yielding, an annular supporting-table, C, surrounding the shaft, a form, F, upon the shaft to fit within the opening of the supporting-table, a cam, G, upon the shaft below the supporting-table, and a wedge, $k$, connected with a lever, H, and actuated by the lever to engage with the cam and depress the shaft against the resistance of the spring, substantially as described.

9. In a coiling-machine, the combination, with the base A, of a rotary shaft, D, a spring, E, supporting the shaft to render it yielding, an annular supporting-table, C, surrounding the shaft, a notched form, F, upon the shaft to fit within the opening of the supporting-table, a cam, G, upon the shaft below the supporting-table, a wedge, $k$, a lever, H, connected with the wedge, and by which the wedge is operated to engage with the cam and depress the shaft against the resistance of the spring, a wedge, *l*, to enter the notch in the form, and a lever, D', fulcrumed to the shaft, and to which the wedge *l* is loosely pivoted, substantially as described.

10. A machine for coiling bar metal, comprising in combination a base, A, supporting standards B *q*, a rotary shaft, D, a spring, E, supporting the shaft to render it yielding, an annular supporting-table, C, surrounding the shaft and carried by the standards, a notched form, F, upon the shaft to fit within the opening of the supporting-table, a yielding presser-roll, I, upon the table to operate with the form in coiling the bar, a cam, G, upon the shaft below the supporting-table, a wedge, *k*, a lever, H, connected with the wedge, and by which the wedge is actuated to engage with the cam and depress the shaft against the resistance of the spring E, a wedge, *l*, to enter the notch in the form, and a lever, D', fulcrumed to the shaft, and to which the wedge *l* is loosely pivoted, the whole being constructed and arranged to operate substantially as described.

JAMES J. ANDERSON.

In presence of—
HENRY HUDSON,
JULIUS W. DYRENFORTH.